United States Patent [19]

Awerbuch et al.

[11] Patent Number: 4,479,351
[45] Date of Patent: Oct. 30, 1984

[54] VENTURI FLASH CIRCULATOR FOR GEOTHERMAL APPARATUS

[75] Inventors: Leon Awerbuch, San Francisco; Alfred N. Rogers, Pleasanton, both of Calif.

[73] Assignee: Electric Power Research Institute, Inc., Palo Alto, Calif.

[21] Appl. No.: 506,722

[22] Filed: Jun. 22, 1983

[51] Int. Cl.³ .............................................. F03G 7/00
[52] U.S. Cl. .................. 60/641.5; 60/641.2; 210/170; 210/714; 210/747
[58] Field of Search .................. 60/641.2, 641.5; 210/170, 714, 715, 747; 159/DIG. 13; 203/7, DIG. 20

[56] References Cited

U.S. PATENT DOCUMENTS

| | | | |
|---|---|---|---|
| 4,304,666 | 12/1981 | Van Note | 60/641.2 |
| 4,370,858 | 2/1983 | Awerbuch | 60/641.2 |
| 4,428,200 | 1/1984 | McCabe | 60/641.5 |
| 4,429,535 | 2/1984 | Featherstone | 60/641.2 |

Primary Examiner—Allen M. Ostrager
Attorney, Agent, or Firm—Flehr, Hohbach, Test, Albritton & Herbert

[57] ABSTRACT

Apparatus and method for improved circulation and solid fraction removal in geothermal energy recovery. Geothermal fluid is directed into an integrated flasher-crystallizer-separator reactor, used in one or more flash stages, for substantially continuous recovery of the energy values of the incoming geothermal fluid while simultaneously allowing for growth of crystals and separation of the liquid fraction of fluid from the solid fraction. The geothermal fluid flows through a vertical Venturi tube, thereby creating a low pressure area near the entrance to the tube. The low pressure area draws in the liquid containing seed crystals from the surrounding bath, thereby presenting the incoming brine with a large population of seed crystals and also promoting vigorous agitation in the reactor without the use of mechanical agitators. In a second aspect of the invention, a small stream of partially flashed fluid is reintroduced to the reactor at a solids disengaging section, sweeping smaller crystals therein back into the agitated brine for use as seed crystals in the reactor. In a third aspect of the invention, a downstream reactor has larger and slower clarification means than upstream reactor for efficient clarification of the liquid fraction before reinjection into a disposal well.

13 Claims, 2 Drawing Figures

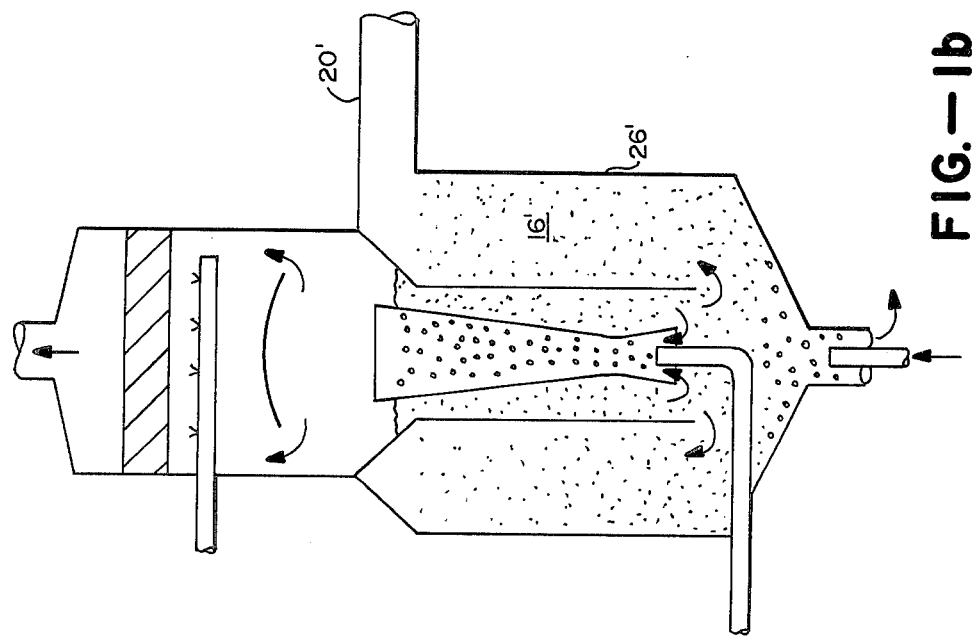
FIG.—1b
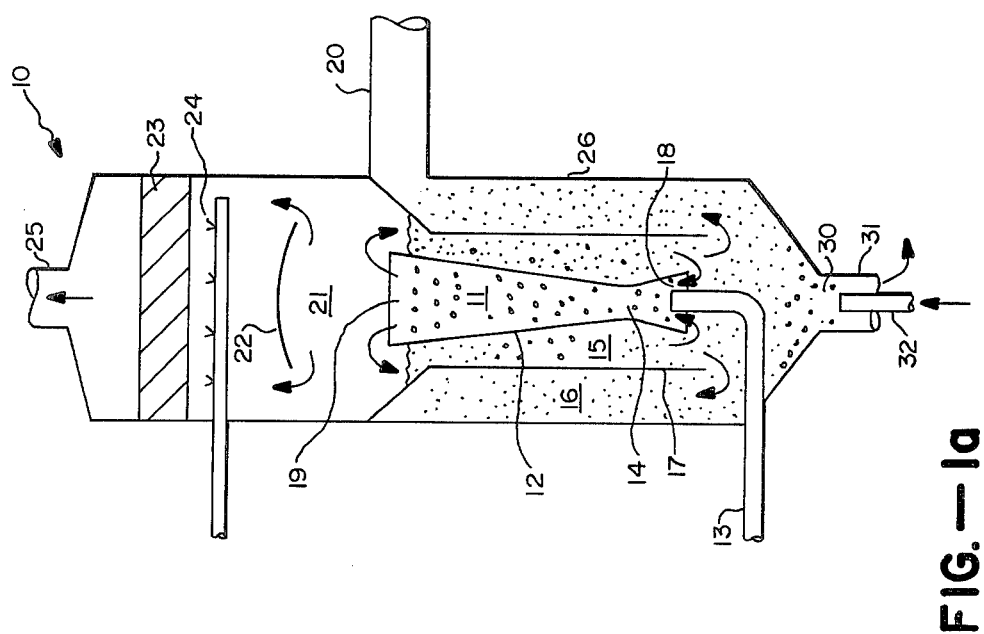
FIG.—1a

VENTURI FLASH CIRCULATOR FOR GEOTHERMAL APPARATUS

This application is related to the subject matter of U.S. Pat. No. 4,370,858, entitled Apparatus and Method for Energy Production and Mineral Recovery from Geothermal and Geopressured Fluids, which is hereby incorporated by reference.

This invention relates generally to the use of geothermal brines for electrical energy production and mineral recovery. More specifically this invention relates to an improved method and apparatus for separation of suspended solids in geothermal brines from the liquid and gaseous fractions thereof.

One of the primary problems in geothermal energy recovery systems is the control of scale formation from suspended solids in the extracted geothermal brine. As the dissolved gases in the brine are released and as the brine's temperature drops, the brine becomes supersaturated with respect to solids, such as silica, metal sulfides and metal sulfates or carbonate compounds. The precipitation of these produces scale formations that can destroy or plug up plant components and reinjection wells.

Generally it is desirable to separate the gaseous, liquid and solid fractions of the brine from one another simultaneously in one or more flash stages.

Also, it is desirable to extract the solid portion of the brine in the form of large crystals which are easy to handle in chemical processing and land fill applications. Finally, the system should ideally be designed to automatically inhibit the formation of scales on the surfaces of the equipment, thereby avoiding the need for costly system shutdowns for the removal of scale formations.

The present invention provides an improved integrated flasher-crystallizer reactor, used in one or more flash stages, for substantially continuous recovery of the energy values of the incoming geothermal fluid while simultaneously allowing for growth of crystals and separating the liquid fraction of the fluid from the solid portion.

The present invention provides an improved fluid circulation system through the use of an input nozzle which discharges into the throat of a vertical Venturi tube. The flow of brine through the Venturi tube creates a low pressure area near the entrance to the tube, promoting upward flow of brine in the reactor through the Venturi draft tube. The resulting vigorous agitation is achieved without the use of mechanical agitators. From the moment the brine enters the Venturi draft tube, the agitation presents a large population of crystals to the brine to relieve its supersaturation, thereby minimizing spontaneous nucleation on the walls of the reactor.

A second aspect of the present invention is an improved elutriation system. A small stream of partially flashed fluid is reintroduced to the reactor at a solids disengaging section to sweep the smaller crystals therein back into the agitated brine. The returned crystals act as seeds in the flasher-crystallizer.

Thus the primary object of the present invention is to provide an improved apparatus and method for handling geothermal or geopressured fluids taken directly from a subterranean well and extracting the energy and mineral values therefrom in a single reactor with minimal scale deposition on the apparatus.

The invention and objects and features thereof will be more readily apparent from the following detailed description and appended claims when taken with the drawings, in which:

FIG. 1a depicts the cross sectional view of a flasher-crystallizer-separator reactor, and FIG. 1b depicts a variation of the same.

Figure 2:
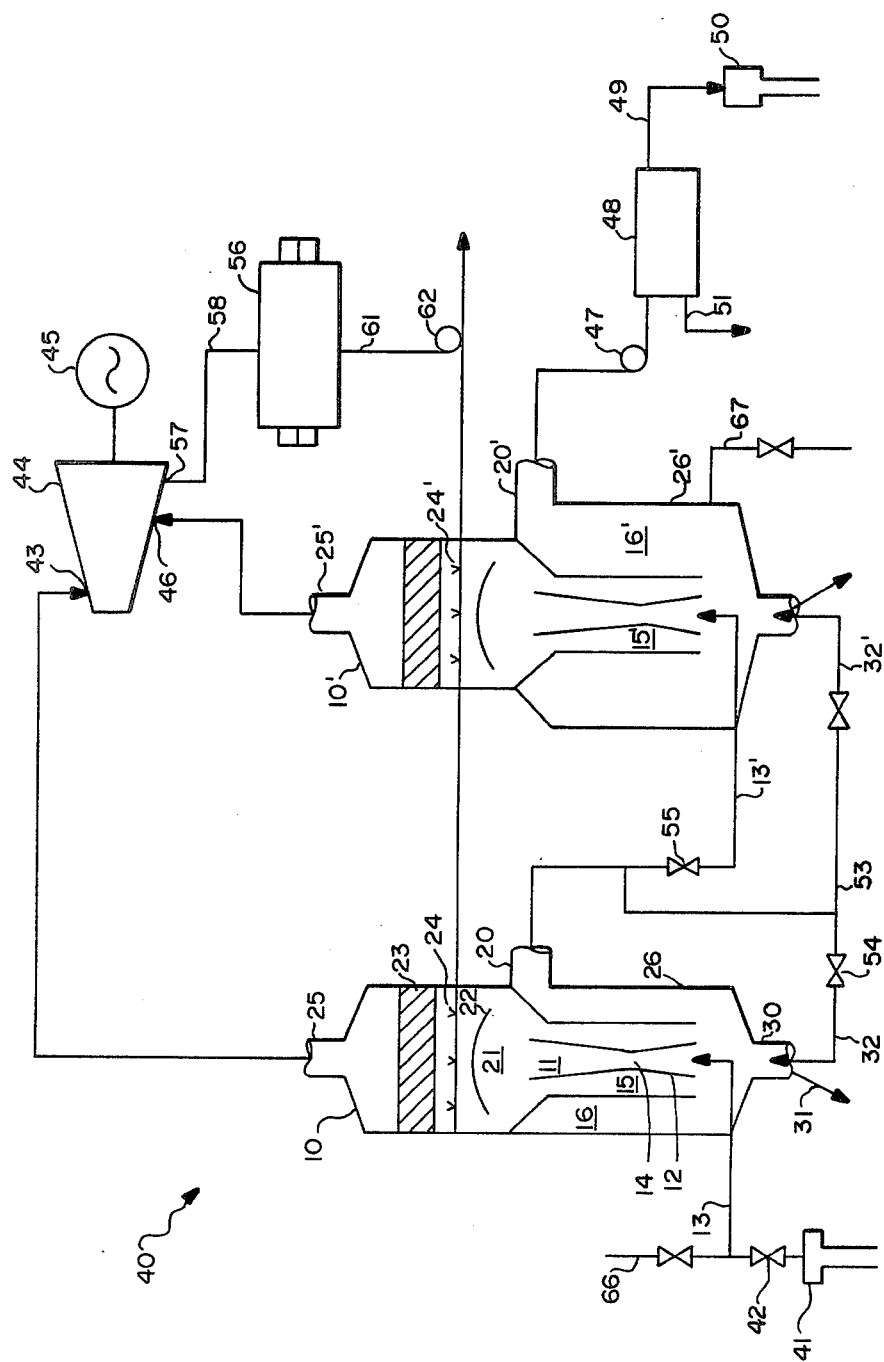
FIG. 2 is a schematic view of a two reactor system for geothermal power production and mineral recovery.

The terms silica, scale and scale former are used interchangeably herein to refer to silica and other minerals comprising the solid fraction of a geothermal fluid. These other minerals include, but are not limited to, compounds of iron, lead, silver, calcium and magnesium.

Referring to FIG. 1a, there is a cross-sectional view of a flasher-crystallizer-separator, hereinafter referred to as a reactor 10. This reactor is generally similar in design to the reactor shown in U.S. Pat. No. 4,370,858. Thus the description of the reactor of the present invention will concentrate on the improvements incorporated therein.

The reactor 10 has a first zone 11 defined by body 12. Body 12 in the present invention is a Venturi-shaped tube having a tapered body between its inlet 18 (near the outlet of the pipe 13) and outlet 19. That is, the tube has a constricted (Venturi) throat 14 of narrower cross section than either the inlet or outlet.

A second zone 15 surrounds and is in fluid communication with the first zone 11. A third zone 16 concentrically surrounds the second zone 15 and is separated therefrom by a vertical baffle 17 open at the bottom.

The third and outer zone 16 of the reactor 10 is coupled to outlet line 20 for directing fluids out of the reactor 10.

An open space 21 above the first 11 and second 15 zones is occupied by a deflector plate 22, mist eliminator 23, and condensate sprinkler 24. Steam flashed from liquids in zones one 11 and two 15 circulate through open space 21, around deflector plate 22 and through the mist eliminator 23 before leaving the reactor through line 25 at the top of the reactor 10.

Brine entering by line 13 generally rises through body 12 and overflows into second zone 15, in which the brine has a generally downward flow. Except for that portion of the brine which recirculates from second zone 15 back through the inlet 18 of body 12, the brine then rises through outer zone 16 towards outlet 20.

Sludge accumulation section 30 in the lower portion of reactor 10 includes a sludge removal line 31 and an elutriation input line 32.

FIG. 1b depicts a modified version of the reactor shown in FIG. 1a, the modification comprising an enlarged third sector 16' (16 in FIG. 1a) formed by having an outer wall 26' of greater diameter (i.e., average horizontal cross section) than in the FIG. 1a version. The significance of this variation is that the broader third zone allows a slower rise rate and greater clarification of the fluid in the reactor 10 than otherwise possible, as will be explained in greater detail below.

Referring to FIG. 2 in conjunction with FIGS. 1a and 1b, the apparatus of the present invention works as follows. Geothermal brine is extracted from a subterranean location, depicted as well 41, and directed by valve 42 and line 13 to reactor 10. The brine generally contains water, dissolved and suspended minerals, and dissolved gases. The brine is typically extracted at a temperature of 260° C. (500° F.) to 225° C. (437° F.).

Upon entry into reactor 10 the brine is flashed down to a temperature of 180° C. (356° F.), releasing steam through steam line 25, at approximately 11 atmospheres pressure, in a process explained below. Line 25 is coupled to the inlet of a steam-actuated work-producing apparatus, such as the high pressure inlet 43 of a turbine 44 coupled to an electric generator 45. In this way, the energy values of the brine from a geothermal well can be extracted and used to perform useful work.

The flash process begins as the brine is released from input line 13 into the inlet 18 of Venturi body 12. Upward motion of the brine through the Venturi body is facilitated by the relatively high pressure brine in line 13 being released into the low pressure zone of the Venturi throat 14. Other contributing factors are the rising bubbles of steam and gas being released from the brine and the flow pattern of liquid from second zone 15 being drawn into the inner zone 11 of Venturi body 12 (which is described below).

The flow pattern established by Venturi body 12 is based on Bernoulli's equation $$p + \tfrac{1}{2}dv^2 + dhg = C$$

where p is pressure, d is density of the fluid (mass per cubic volume), v is the velocity of the fluid at any point in the Venturi body 12, h is the relative height of the fluid where the velocity and pressure are being measured, and C is a constant.

The net result of applying Bernoulli's equation to the Venturi body 12 of the present invention is that the rising brine picks up velocity as it passes through Venturi throat 14 thereby creating a low pressure zone 14. This low pressure zone draws fluid in from second zone 15 near the inlet 18 of the Venturi body 12, thereby increasing recirculation of the fluid in second zone 15 through first zone 11. The resulting agitation provides intimate contact of the solid, liquid and vapor fractions of the fluid in a three-phase fluidization relationship. Thus the key characteristic of body 12 is its constricted throat 14 which, when liquid flows through it, creates a low pressure area which draws liquid in from the area surrounding the inlet. As described below, the silica crystals and other scale formers in this recirculated liquid provide seed crystals for the incoming brine.

After the brine passes through inner zone 11, flashed steam and gases, along with splashing liquid and suspended solids, rise into open space 21. Baffle 22, a curved deflector plate, prevents fluids and solids from rising any further, deflecting them generally into second zone 15. Vapor or steam leaving Venturi body 12 is deflected around plate 22 and then rises through mist eliminator 23 before flowing out of reactor 10 through line 25. Nozzles 24 intermitently direct condensate or other purified liquid onto the mist eliminator 23 to clean it.

Crystal formation and sludge removal proceeds as follows. The basic principle used is to provide seed crystals having a combined reactive surface area far exceeding the surface area of the walls of the apparatus in reactor 10, preferrably by a factor of more than 1,000, thereby encouraging the growth of large crystals from suspended solids and discouraging the formation of destructive scales on apparatus walls. The improved apparatus of the present invention facilitates this process, as will be described in more detail below, by recirculating fluids through inner zone 11 to provide incoming brine with a population of seed crystals and by selectively removing large crystals of silica while sweeping smaller crystals back into the agitating flow of fluids.

As brine enters Venturi body 12, the brine is presented with a large population of seed crystals from fluid in second zone 15 which is also being drawn into the Venturi body. As the brine rises through Venturi body 12 the temperature of the brine drops, thereby causing the solids dissolved in brine to become supersaturated. Precipitation of the supersaturated solids is facilitated by the population of seed crystals. Thus, significant crystal growth occurs during the passage of the brine through Venturi body 12. The brine, including crystals, overflows into second zone 15, the fluids in which have a generally downward flow. A portion of the fluid in the second zone 15, including the suspended crystals just described, is drawn back into Venturi body 12 as described above. The remaining fluid in second zone 15 flows under baffle 17 into outer zone 16. The fluid in outer zone 16 rises towards outlet line 20 at a rate directly proportional to the inlet rate from the well 41 and inversely proportional to the horizontal cross-sectional area of the outer zone 16.

As the fluid flows through second zone 15 and outer zone 16, the seed crystals grow larger. The relatively calm flow pattern in outer zone 16 permits these crystals to precipitate and fall into sludge accumulation section 30. The crystals precipitating into sludge accumulation section 30 are subjected to a gentle elutriation stream from elutriation input line 32 for the purpose of washing smaller crystals back into the agitating brine for use as seed crystals. The purpose of this elutriation system is to enable the extraction of silica crystals amenable to filtering and compressing into a cake. Large crystals are much more amenable to cake formation than small crystals which tend to create an unmanageable soup or sludge. The resulting cake from this process is suitable for efficient mineral extraction and/or landfill.

The second stage of system 40, i.e., reactor 10', is substantially the same in construction as its first stage. The most significant differences are that incoming brine on line 13' is the partially clarified fluid output of reactor 10, and the horizontal cross section of outer section 16' is, in one embodiment, approximately twice that of outer section 16 in first stage reactor 10. Upon entry into the second stage reactor 10', the brine is flashed down from approximately 180° C. (356° F.) to approximately 105° C. (221° F.). The resulting steam is directed through line 25' to the intermediate pressure inlet 46 of turbine 44.

The fluid leaving second stage reactor 10' by line 20' first passes through enlarged outer zone 16'. The slower rise rate therein allows substantially greater clarification than in the first stage. By making the second stage's reactor have a large clarification section 16' the first stage can have a smaller clarification section 16, thereby saving on construction costs without significantly hurting system performance.

Output line 20' is coupled to pump 47 and filter 48. Fluid line 49 couples filter 48 to reinjection well 50 for receiving spent brine. Filter 48 also has means 51 for removing the filter cake therefrom.

FIG. 2 shows elutriation input lines 32 and 32' being fed from the output of the stage one reactor 10 via line 53 and valves 54 and 55. However, alternate sources of elutriation fluid, such as the output of well 41, could be used.

Nozzles 24 and 24' use condensate from condenser 56. Condenser 56 is coupled to the fluid outlet 57 of turbine 44 by line 58 and is coupled to nozzles 24 and 24' by line 61 and pump 62.

Crystal growth occurs in reactor 10 primarily in the inner zone 11, and in decreasing magnitude in second zone 15 and outer zone 16. While the crystal growth can be self-nucleating, the reactor can initially be charged with a bed of seed particles having the same or similar chemical composition as the minerals to be recovered. Seed crystals for initiating and/or facilitating crystal growth may be introduced through line 66 to reactor 10 and line 67 to reactor 10'.

A geothermal energy and mineral recovery system in accordance with the invention enables improved silica crystal removal and mineral recovery. While the system has been described with reference to a specific embodiment, the description is illustrative of the invention and is not to be construed as limiting the invention. For instance, the system may contain three or more serially connected reactors rather than just two. Various modifications may occur to those skilled in the art without departing from the true spirit and scope of the invention as defined by the appended claims.

What is claimed:

1. A system for processing fluid from a subterranean location with the fluid having an elevated temperature and pressure, having dissolved and suspended solids therein; and capable of being separated into solid, liquid and vapor fractions comprising:
   a reactor for receiving a flow of the fluid from a subterranean location;
   means in the reactor for permitting the fluid received thereby to flash to form the vapor fraction and to provide intimate contact of the solid, liquid and vapor fractions of the fluid in a three-phase fluidization relationship;
   said permitting means including a tubular body having a fluid inlet, a fluid outlet above the inlet, and a middle tubular section with a throat of smaller cross-sectional area than the inlet and outlet.

2. The system as set forth in claim 1, further including:
   means coupled with the reactor for directing the vapor fraction out of the reactor;
   means in the reactor for causing at least a portion of the liquid fraction of the fluid to separate from the solid fraction thereof, said solid fraction precipitating in the form of crystals of varying size;
   means coupled with the reactor for allowing removal of at least a portion of the solid fraction from the reactor; and
   means coupled with the reactor for directing the separated liquid fraction out of the reactor.

3. The system as set forth in claim 2, wherein said removal means includes fluid inlet means for washing relatively small crystals from the removal means back into the reactor for use as seed crystals therein.

4. The system as set forth in claim 3, wherein said reactor includes a sludge accumulation section in the lower portion of said reactor for receiving precipitating crystals, and wherein said fluid inlet means directs inflowing fluid counter to the gravitational flow of the precipitating crystals.

5. The system as set forth in claim 4 wherein said removal means is coupled to the bottom of said sludge accumulation section by concentric connection means, the inner connection means being the fluid inlet means and the outer connection means comprising sludge outlet means.

6. The system as set forth in claim 2 wherein said causing means includes two concentric chambers, the inner chamber in fluid communication with the tubular body both at the inlet and outlet of the tubular body and having a generally downward flow of fluids therein, the outer chamber in fluid communication with the inner chamber at the lower section of both chambers, the outer chamber having a generally upward flow of fluids therein and coupled to said directing means at the upper portion of the outer chamber,
   wherein the diameter of the outer chambers controls the upward flow rate therein and thus controls the degree of separation of suspended solids from the fluid rising towards the directing means.

7. The system as set forth in claim 6, further including a second reactor of similar design to the (first) reactor for receiving the liquid fraction of the liquid from the first reactor and for extracting at least a portion of the remaining energy values in the liquid fraction,
   wherein the outer chamber of the second reactor is relatively large compared with the first reactor, thereby permitting the use of relatively thin retaining wall materials in the first reactor to hold the relatively small volume of liquid therein, and permitting the relatively fast rise of fluid therein, thereby causing the liquid fraction to have a relatively high concentration of suspended solids while the relatively slower rise rate of fluid in the outer chamber of the second reactor ensures a relatively low concentration of suspended solids in the liquid fraction.

8. A method of processing a fluid from a subterranean location with the fluid having an elevated temperature and pressure having dissolved and suspended solids therein and capable of being separated into solid, liquid and vapor fractions, the steps of the method comprising:
   directing the fluid into a first zone, said first zone defined by Venturi-shaped tubular body;
   fluidizing the fluid in said first zone to cause the solid, liquid and vapor fractions of the fluid to be in intimate contact with each other;
   directing the vapor fraction out of the first zone;
   moving the remainder of said solid and liquid fractions of the fluid to a second zone adjacent to the first zone;
   separating at least a portion of the liquid fraction of the fluid in the second zone from the solid fraction;
   growing crystals in the first and second zones as a function of the movement of the fluid through said zones;
   removing crystals from the second zone; and
   directing the separated liquid fraction out of the second zone.

9. A method as set forth in claim 8, wherein the flow of fluid into the first zone through the narrowest section of the tubular body creates a low pressure zone at the inlet to the first zone, thereby drawing in fluid from the second zone and recirculating it through the first zone.

10. A method as set forth in claim 9, further including the step of
   circulating fluid through the crystals to be removed from the second zone thereby recirculating the relatively small crystals back into the second zone for use as seed crystals therein.

11. A system for processing fluid from a subterranean location with the fluid having an elevated temperature and pressure, having dissolved and suspended solids therein; and capable of being separated into solid, liquid and vapor fractions comprising:

a reactor for receiving a flow of the fluid from a subterranean location;

means in the reactor for permitting the fluid received thereby to flash to form the vapor fraction and to provide intimate contact of the solid, liquid and vapor fractions of the fluid in a three-phase fluidization relationship;

means coupled with the reactor for removing at least a portion of the solid fraction from the reactor, including means for receiving said solid fraction precipitating in the form of crystals of varying size, and including fluid inlet means for washing relatively small crystals from the receiving means back into the reactor for use as seed crystals therein.

12. A system for processing fluid from a subterranean location with the fluid having an elevated temperature and pressure, having dissolved and suspended solids therein; and capable of being separated into solid, liquid and vapor fractions comprising:

at least two serially connected reactors for receiving a flow of the fluid from a subterranean location;

means in each reactor for permitting the fluid received thereby to flash to form the vapor fraction and to provide intimate contact of the solid, liquid and vapor fractions of the fluid in a three-phase fluidization relationship;

means in each reactor for causing at least a portion of the liquid fraction of the fluid to separate from the solid fraction thereof;

means coupled with each reactor for allowing removal of at least a portion of the solid fraction from the reactor;

means coupled with each reactor for directing the separated liquid fraction out of the the reactor;

wherein said causing means in at least one downstream reactor causes the separated liquid fraction to have a relatively low concentration of suspended solids therein in comparison to the concentration of suspended solids leaving the reactor first receiving the fluid from a subterranean location.

13. The system as set forth in claim 12 wherein each said causing means includes a chamber having a generally upward flow of liquids therein and coupled to said directing means at the upper portion of said chamber, wherein the size of the horizontal cross-section of the chamber controls the upward flow rate therein and thus controls the degree of separation of suspended solids from the liquid rising towards the directing means, and wherein the horizontal cross-section of the downstream reactor is relatively large compared to the horizontal cross-section of the first reactor.

* * * * *